May 12, 1964

J. L. PETRELLA ETAL 3,132,710

VEHICLE GROUND GUIDANCE SYSTEM

Filed Aug. 3, 1960

INVENTORS
JOSEPH L. PETRELLA
JOHN S. STRANCE

BY Williams, Tilberry & Hodrick

ATTORNEYS

May 12, 1964 J. L. PETRELLA ETAL 3,132,710
VEHICLE GROUND GUIDANCE SYSTEM
Filed Aug. 3, 1960 4 Sheets-Sheet 2

INVENTORS
JOSEPH L. PETRELLA
JOHN S. STRANCE
BY
Williams, Tilberry & Dolrick
ATTORNEYS May 12, 1964
J. L. PETRELLA ETAL
3,132,710
VEHICLE GROUND GUIDANCE SYSTEM
Filed Aug. 3, 1960
4 Sheets-Sheet 3
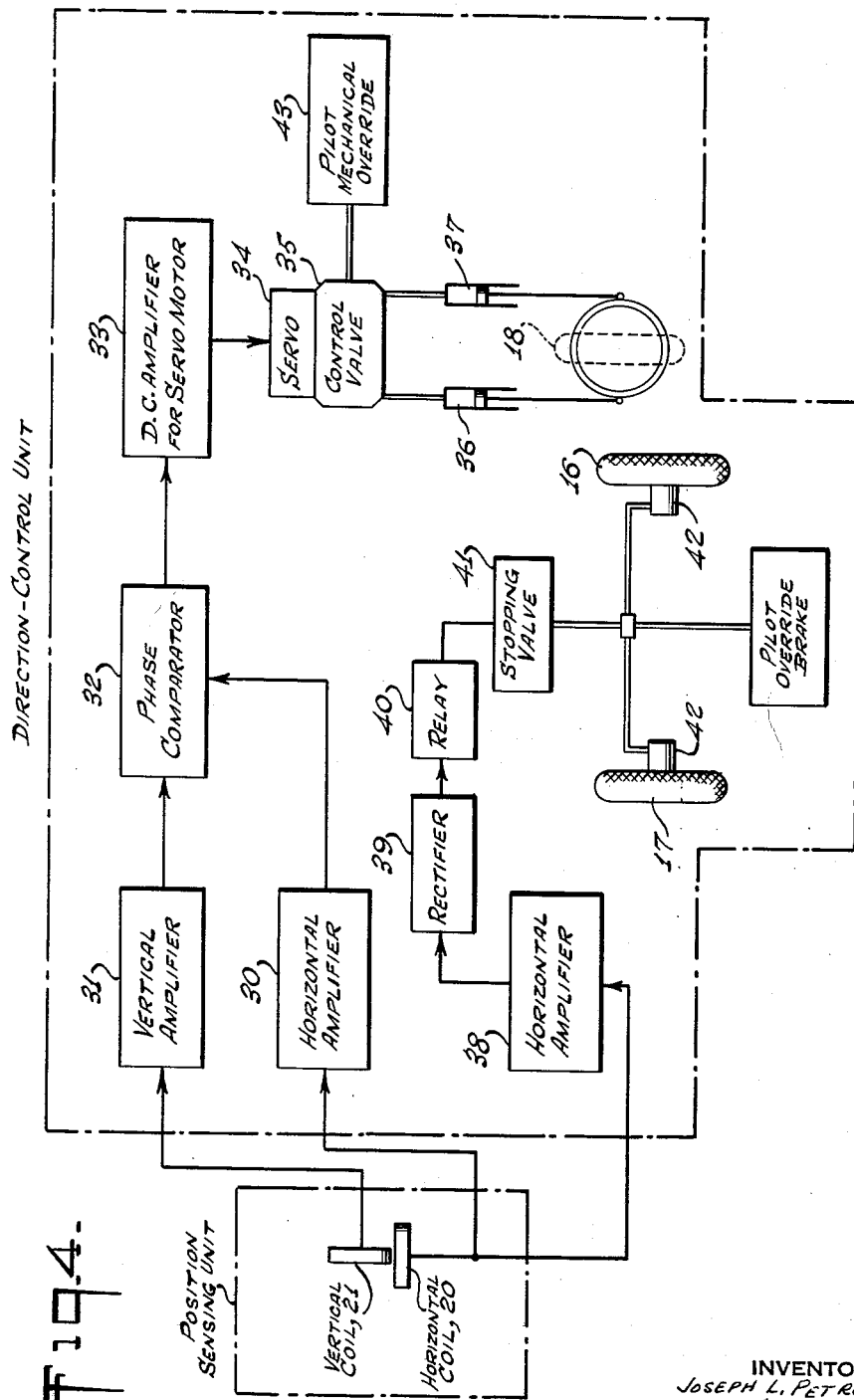
INVENTORS
JOSEPH L. PETRELLA
JOHN S. STRANCE
BY
Williams, Tilbury & Sdrick
ATTORNEYS

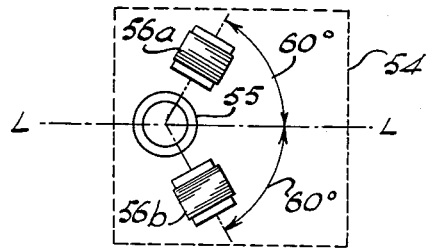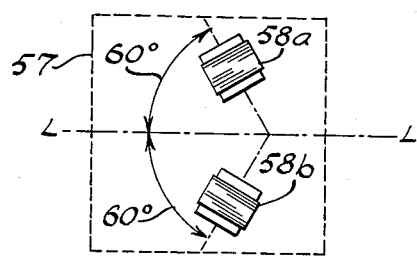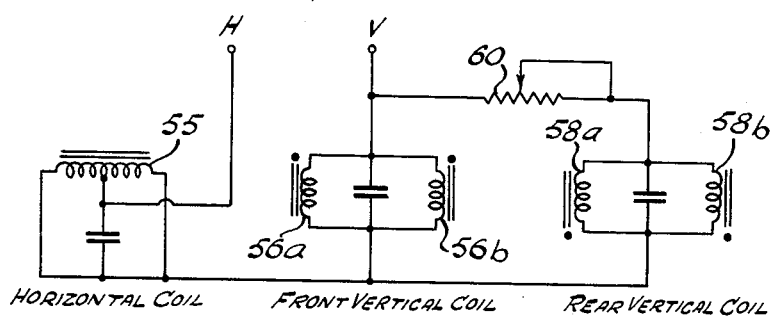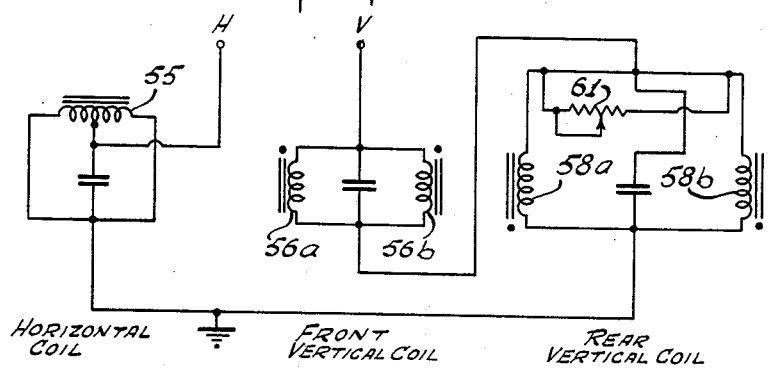

United States Patent Office
3,132,710
Patented May 12, 1964

3,132,710
VEHICLE GROUND GUIDANCE SYSTEM
Joseph L. Petrella, Canton, Ohio, and John S. Strance, Philadelphia, Pa., assignors to E. W. Bliss Company, Canton, Ohio, a corporation of Delaware
Filed Aug. 3, 1960, Ser. No. 47,319
12 Claims. (Cl. 180—79.1)

The present invention relates to systems for automatically guiding vehicles along preselected ground paths, and more particularly to systems for automatically guiding aircraft into predetermined ground positions.

At present, an aircraft is taxied into a selected ground position by its pilot, normally with the aid of ground markings and hand signal instruction. In addition to the obvious dangers involved, such guidance is necessarily inaccurate and slow. These limitations are undesirable from both the military and commercial viewpoint. For example, the guidance of aircraft to catapult positions on the deck of a carrier vessel should be accomplished with greater efficiency. In busy commercial air terminals, on the other hand, congested ramp conditions often occur.

Accordingly, it is a primary object of the present invention to provide a ground guidance system whereby vehicles, in particular aircraft, may be automatically guided along preselected ground paths.

It is another object of the present invention to provide a ground guidance system whereby aircraft may automatically be taxied into predetermined ground positions.

A system in accordance with the invention may include a path-defining unit and a vehicle-directing unit.

The path-defining unit may comprise a pair of conductors arranged to define the lateral boundaries of a predetermined ground path, means for electrically interconnecting such conductors to form a closed circuit loop, and generator means for causing alternating current to flow in the loop.

The vehicle-directing unit may comprise an electrical substantially horizontally arranged pick-up coil, an electrical substantially vertically arranged pick-up coil, circuit means for comparing the phase of the output signals derived from these two pick-up coils, and steering means responsive to the results of such phase comparison for maintaining the vehicle within the path defined by the said conductors.

Another aspect of the present invention is the provision of means for automatically stopping a vehicle after it has reached a predetermined position along the defined path. This is accomplished by electrically inter-connecting the path-defining conductors by means of at least one transverse link which is arranged at the desired stop position, while adapting the vehicle braking means to be actuated by a reduction of the signal output from the horizontal pick-up coil to below a preselected level. This aspect also provides a safety measure whereby the vehicle is automatically stopped if it strays beyond the path boundaries or if a power failure occurs.

A complete understanding of the invention may be obtained from the following detailed description of systems forming specific embodiments thereof, when read in conjunction with the appended drawings, in which:

FIG. 4 is a block diagram of a vehicle-directing unit in accordance with the invention;

Figure 5:
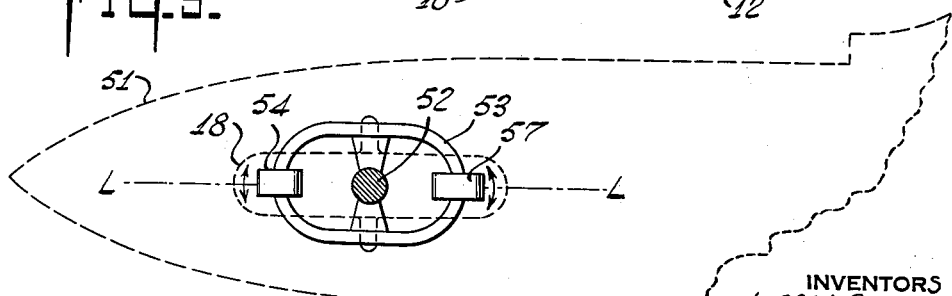

FIGS. 5, 5A and 5B are plan views illustrating preferred arrangements of the horizontal and vertical pick-up coils; and FIGS. 6 and 6A are circuit diagrams illustrating preferred electrical interconnections of the horizontal and vertical pick-up coils as arranged in FIGS. 5, 5A and 5B In describing the selected embodiment, it will be assumed that it is desired to guide a carrier-based aircraft to a preselected catapult position on the carrier deck. The system for accomplishing this end may be considered as divided into two parts: (1) a path-defining unit located on the deck of the carrier, and (2) a vehicle-directing unit located on the aircraft itself.

Figure 1:
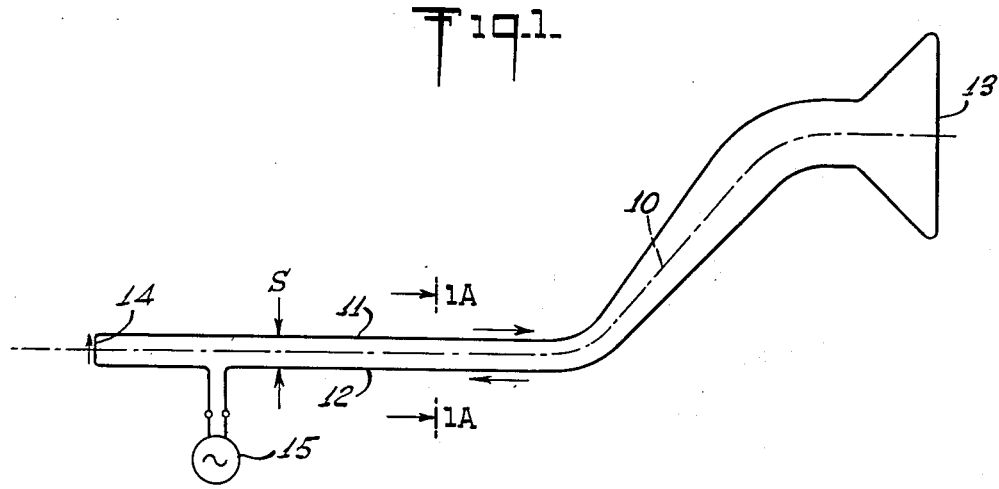
FIG. 1 is a plan view of a path-defining unit in accordance with the invention.

Referring to FIG. 1, the desired path which the aircraft is to follow on the deck of the carrier is indicated by the dot-dash line 10. The path-defining unit takes the form of a pair of conductors 11 and 12 laid out on the deck parallel to, on either side of, and equidistant from this path line. These conductors may either be encased in insulation and permanently imbedded into the deck or take the form of removable adhesive conductive tape.

Adjacent ends of the conductors 11 and 12 are joined together by transverse conductive links 13 and 14, respectively. This provides a closed circuit loop layed out on the deck of the carrier. Alternating-current energy is injected into the circuit loop by means of an A.C. generator 15.

The introduction of alternating-current energy into the closed loop will produce currents in the conductors 11 and 12 which at any instant in time are 180° out of phase, as shown by the longitudinally disposed arrows in FIG. 1. The magnetic fields produced by these currents may therefore be represented as in FIG. 2.

Figure 1A:
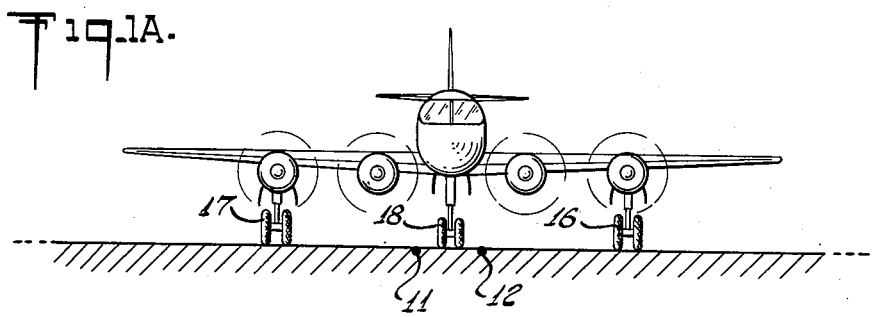
FIG. 1A is a cross-section view taken along line 1A— 1A in FIG. 1 and illustrating the use of the path-defining unit in the guidance of an aircraft.

The transverse link 13 marks the beginning and the transverse link 14 the end of the taxiing path. Advantageously, the conductors 11 and 12 are made to flare inwardly from the link 13 so as to provide an entrance funnel for the aircraft. The normal spacing S between the conductors 11 and 12 will depend upon the size of the aircraft to be guided. FIG. 1A illustrates an exemplary spacing relative to aircraft size.

The second part of the system, that is the vehicle-directing unit, is located on the aircraft itself. This unit may itself be divided into two parts: (a) a position-sensing unit, and (b) a direction-control unit. The position-sensing unit is adapted to provide a signal indicative of the location of the aircraft relative to the conductors 11 and 12. The direction-control unit is adapted to steer the aircraft in response to the signals provided by the position-sensing unit.

Figure 2:
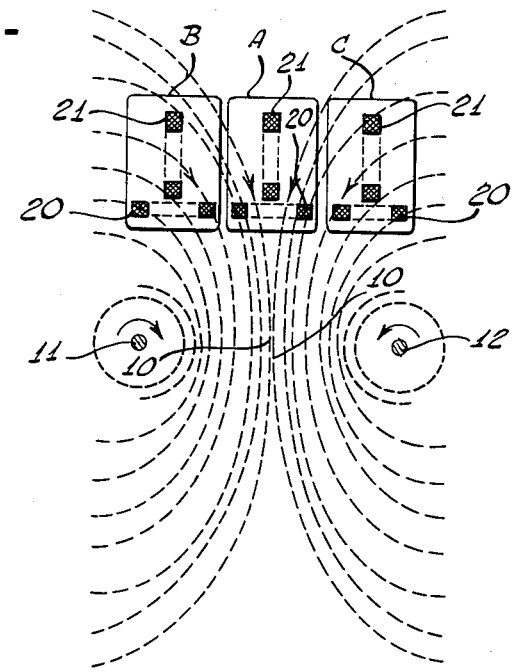
FIG. 2 is a cross-sectional view illustrating the magnetic field pattern produced by the conductors of the path-defining unit of FIG. 1 and the relationship of such pattern to the pick-up coils of the vehicle-directing unit with the coils in different lateral positions relative to the conductors.

FIG. 2 illustrates the manner whereby the position-sensing unit produces the requisite signals. Therein, the position-sensing unit is shown as comprising a horizontally oriented pick-up coil 20 and a vertically oriented pick-up coil 21.

When the position-sensing unit is centrally located directly over the path line 10 (as is the unit within the enclosure A FIG. 2), it will be seen that the equal portions of the magnetic field from both of the conductors 11 and 12 cut through the vertical coil 21. In consequence, these fields cancel one another insofar as their effect upon the vertical coil is concerned, and the vertical coil may be considered to produce no signal. On the other hand, the horizontal coil is subject to both magnetic fields in aiding relationship and produces a significant output signal. These respective signal strengths are indicated at points A on the graph of FIG. 3.

Consider now that the aircraft has moved toward the conductor 11 so as to displace the position-sensing unit to the position occupied by the enclosure B in FIG. 2. In such position, the vertical coil 21 is under the influence of only the magnetic field of the conductor 11 and, therefore, produces an output signal. The value of this output signal is greater the closer the coil is to the conductor since the field direction relative to the coil becomes more perpendicular. Conversely, the further the horizontal coil 20 is moved toward the conductor 11, the more parallel the magnetic field becomes relative thereto, and the weaker the signal produced thereby. The changes in the magnitude of the output signals produced by the horizontal and vertical coils with changes in their position is graphically illustrated in FIG. 3. It will be noted that the signal produced by the horizontal coil when it is located directly over the conductor 11 reduces, for all practical purposes, to zero.

Similarly, movement of the position-sensing unit from the path line 10 toward the conductor 12 results in increase of the signal produced by the vertical coil 21 and decrease of the signal produced by the horizontal coil 20.

It will thus be seen that the magnitude of the signals produced by the vertical and horizontal coils of the position-sensing unit may be made to be indicative of the fact that the aircraft has strayed from the path line 10. The magnitude of the signals alone, however, does not provide an indication as to which direction, either to the right or to the left of the path line, the aircraft has taken. This information is provided, in the present invention, by the phase of the output signal from the vertical coil 21.

The proof of this is found in FIG. 2, where it will be noted that the direction of the lines of magnetic flux passing through the vertical coil 21 depends upon whether the coil is located to the right or to the left of the path line 10. This is due to the fact that the currents passing through the conductors 11 and 12 are, at any instant of time, 180° out of phase.

It should be noted that no such direction information is provided by horizontal coil 20. Because of its horizontal orientation, flux lines always pass through the coil 20 in the same direction regardless of its position relative to the path line 10.

As is illustrated in FIG. 4, the signals produced by the position-sensing unit are applied to the direction-control unit. This second part of the vehicle-directing unit is also located on the aircraft itself. For simplicity's sake, the direction-control unit is shown in block diagram form since its functional building blocks may be made up of electrical circuits and mechanical components which are well known in the art.

The signal outputs of the horizontal coil 20 and the vertical coil 21 are connected to a horizontal amplifier 30 and a vertical amplifier 31, respectively. These amplifiers are employed to boost the signal strength to a workable level.

The outputs of the horizontal and vertical amplifiers 30 and 31 are coupled into a phase comparator 32. This circuit is designed to compare the phase of the input signals applied to it. In making such comparison, the comparator utilizes the signal from the horizontal coil 20 as a reference since that signal maintains a constant phase. From this comparison, the circuit 32 is adapted to produce a D.C. output voltage the polarity of which is indicative of the phase relationship between the vertical and horizontal signals. In consequence, this voltage provides an indication of the direction in which the aircraft has strayed from the path line 10.

The phase comparator 32 is also designed so that the value of its D.C. output voltage provides an indication of the distance by which the aircraft has strayed from the path line 10. This may be effected by making the value of the output voltage proportional to the amplitude of the vertical input signal. As may be seen from FIG. 3, the amplitude of the vertical signal varies substantially uniformly with distance from the path line 10.

Accordingly, the D.C. output voltage of the phase comparator 32 provides all the information necessary for returning the aircraft back to its designated course. This voltage is therefore used as a control input to the steering mechanism of the aircraft. Often, such steering is obtained by wheel braking; that is, referring to FIG. 1A, by selectively applying braking to either the left wheel 16 or the right wheel 17 of the aircraft. Other times, such steering is obtained by turning the nose wheel 18. The present system is equally applicable to both steering systems.

One means whereby the D.C. output voltage of the phase comparator may be utilized to steer the aircraft along the designated path line 10 is shown in FIG. 4. Such means is adapted to work in conjunction with an aircraft which utilizes a hydraulically operated nose-wheel steering system.

In this means, the output of the phase comparator 32 is applied to a D.C. amplifier 33 to be amplified to an appropriate value. The output voltage from the D.C. amplifier is applied to a servo motor 34 which is connected to operate a hydraulic control valve 35. The control valve is adapted to direct operating fluid into either a left steering cylinder 36 (to turn the aircraft to the left) or a right steering cylinder 37. The cylinder selected depends upon the direction of rotation of the servo motor 34, which in turn is made to depend upon the polarity of the voltage applied thereto from the D.C. amplifier 33.

The relationship between the polarity of the phase comparator output voltage and the steering cylinder selected is, of course, made such that the aircraft is directed back to the path line 10. This, in turn, reduces the amplitude of the signal from the vertical pick-up coil (FIG. 3) until it finally reaches zero when the aircraft returns to the path line. It will be remembered that the value of the phase comparator D.C. output voltage varies with the amplitude of the signal from the vertical pick-up coil. This causes a rotation of the servo motor and therefore imparts, through the control valve and steering cylinders, a steering angle to the nose wheel 18 which varies in direct proportion to the displacement of the aircraft from the path line 10. Consequently, the system provides an automatic damping effect whereby the nose wheel steering angle is ultimately reduced to zero when the aircraft resumes its desired course.

Advantageously, a mechanical override 43 is also provided in the event that the pilot wishes to switch steering control of the aircraft from the automatic system to a manual control.

It should be noted that the system described is readily adaptable to aircraft wherein steering is effected by wheel braking. In that event, the cylinders 36 and 37 would be utilized as brake cylinders for the left and right wheels 16 and 17 of the aircraft, respectively.

As has been described, the horizontal pick-up coil 20 serves the important function of providing a reference signal to which the phase of the signal output of the vertical pick-up coil 21 may be compared. In addition, the horizontal coil serves to provide other equally valuable functions.

Referring again to FIG. 3, it will be seen that the output of the horizontal coil reduces to zero whenever the coil is directly above one of the path-defining conductors 11 or 12. In accordance with the present invention, this aspect is utilized to provide a safety indication whereby, for example, the aircraft may automatically be stopped if it strays out of the area defined by the conductors.

A means for providing such automatic control is shown in FIG. 4. Therein, a portion of the output of the horizontal coil 20 is applied to a second horizontal amplifier 38 wherein the signal is amplified to a working value. The amplified signal is then applied to a rectifier 39 to be converted into a D.C. voltage proportional in value to the amplitude of the A.C. input signal. Finally, this D.C. voltage is applied to a normally-closed relay 40 which controls a solenoid-operated hydraulic stopping valve 41.

The relay 40 in its normally closed state causes the stopping valve 41 to operate so that hydraulic pressure is applied to both the brakes 42 of the wheels 16 and 17, thus stopping the aircraft. However, the relay is adapted to be opened when the D.C. voltage out of the rectifier 39 exceeds a predetermined value thereby to release this braking action.

Figure 3:
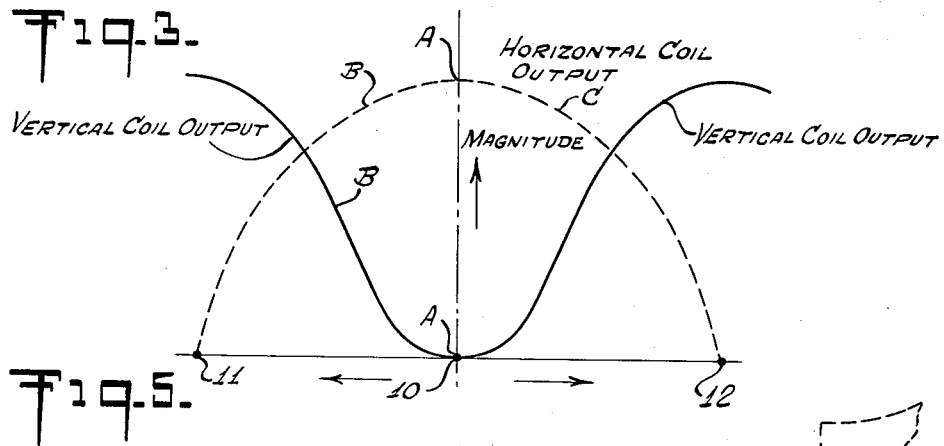
FIG. 3 is a graphical representation of the signal outputs of the horizontal and vertical pick-up coils plotted against the lateral position of the coils relative to the path-defining conductors.

Accordingly, the operation of the horizontal coil 20 in providing a safety stop is as follows. When the horizontal coil is within the area defined by the conductors 11 and 12, it produces a relatively constant high-level signal (FIG. 3). In consequence, a sufficiently large D.C. voltage is applied to the relay 40 from the rectifier 39 to maintain the relay open and to prevent wheel braking. When the horizontal coil approaches close to one or the other of the conductors, however, this D.C. voltage reduces to below the value required to maintain the relay open. The stopping valve 41 is therefore operated and hydraulic braking is applied to the wheels 16 and 17.

The above-described safety feature also operates to stop the aircraft in the event of power failure either in the aircraft or in the path-defining unit. In either event, the horizontal coil will not produce an output signal, the relay will resume its normally closed state, and hydraulic braking will be applied.

This aspect of the present invention may further be employed to bring the aircraft to a halt when it has reached a desired position along the path line 10. Referring again to FIG. 1, it has been indicated that the end of the path is defined by the transverse link 14 which provides a current path between the conductors 11 and 12. Accordingly, as the aircraft approaches the link 14, the signal output of the horizontal coil 20 will diminish just as it does when the aircraft approaches the conductor 11 or 12. Braking action is therefore applied to the aircraft through the medium of the stopping valve 41 when the aircraft reaches this end position.

The use of a transverse stopping link makes possible simple and effective means for selectively choosing different points along the defined path for stopping the aircraft. Such a means, for example, may take the form shown in FIG. 1B. Therein, four different stopping points along the path are defined by the longitudinally displaced transverse links 14, 14a, 14b, and 14c. Each of these links is normally open circuited. A switching arrangement 19 is provided, however, for selectively shorting one of the open circuits thereby to provide the required closed loop current path between the conductors 11 and 12.

Figure 1B:
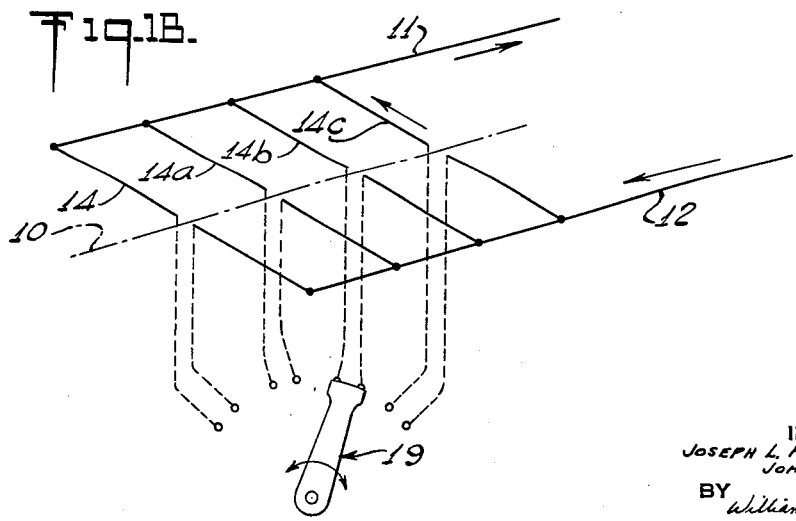
FIG. 1B is a schematic diagram of the end portion of a path-defining unit as in FIG. 1 illustrating means for providing alternative stop positions.

In FIG. 1B, the switch 19 is positioned so as to close the loop through the link 14b. Accordingly, an aircraft progressing longitudinally along the path line 10 will pass over the link 14c since no current is flowing therethrough. It will stop, however, when the horizontal coil 20 is positioned over the current carrying link 14b as a result of the braking action above-described. The transverse links 14, 14a, 14b, 14c, and like additional links, may also be advantageously employed to "inch" aircraft along the predetermined path. This type of control, for instance, is useful where two or more aircraft are in file in the same path, and whereby it is necessary to control the progress of the following aircraft until the lead aircraft has cleared the taxi zone.

In experimental practice, it has been found advantageous to mount the position-sensing unit in the forward portion of the aircraft. Particularly, and where such equipment is provided, it has been found desirable to mount the unit so as to turn with the steerable nose wheel of the aircraft. Such a mounting arrangement is illustrated in FIG. 5.

The nose wheel 18 (in phantom) is shown to be steerably connected to the front end of an aircraft 51 (in phantom) through a steering shaft 52. A frame 53 is attached to the shaft 52 so as to rotate therewith. The position-sensing unit is mounted on this frame forward of the shaft 52 within a housing 54. Accordingly, as the aircraft moves along the prescribed path the position-sensing unit moves before it, producing signals indicative of its position relative to the path defining conductors 11 and 12.

A preferred embodiment of a position-sensing unit which might be enclosed within the housing 54 is illustrated in FIG. 5A. Therein, the horizontal coil is shown at 55, the vertical coil being shown at 56a and 56b. It will be noted that the vertical coil is physically divided into two separate coil parts, the longitudinal axes of the two parts being disposed so as to intersect substantially at the longitudinal axis of the horizontal coil 55 and so as to form an angle of approximately 120° therebetween. It has been experimentally determined that this physical arrangement of the vertical and horizontal pick-up coils gives optimum results.

In accordance with the invention, it has also been found advantageous to utilize a second vertical coil as shown in FIG. 5B. The second vertical coil is enclosed in a housing 57 mounted on the frame 53 to the rear of the shaft 52 and opposite the housing 54. Advantageously, this rear vertical coil is also physically divided into two coil parts 58a and 58b, the longitudinal axes of the two parts being disposed so as to form an angle of approximately 120° therebetween. It will be noted that the coils are so disposed that the longitudinal axis L—L of the aircraft bisects the horizontal coil 55 and the angles between the vertical coils 56a, 56b and 58a, 58b when the nose wheel 18 is pointed straight forward.

Two representative ways in which the coils shown in FIGS. 5, 5A and 5B may be interconnected to provide the desired output signals are shown in the circuit diagrams of FIGS. 6 and 6A. In both diagrams it will be seen that each vertical coil is electrically formed by connecting its physically separate parts 56a, 56b or 58a, 58b in parallel. FIG. 6, however, is distinguished from FIG. 6A in that the former shows a circuit arrangement wherein the front and rear vertical coils are connected in parallel while the latter shows a circuit arrangement wherein the front and rear vertical coils are connected in series.

With either arrangement, the rear vertical coil performs the same important function. That function is to provide an indication of the angle made by the nose wheel relative to the path line 10. To provide such information the forward and rear vertical coils are connected with their respective windings opposing (as shown by conventional dot notation in FIGS. 6 and 6A) so as to produce signals which tend to cancel out one another.

The action of the rear vertical coil may best be described by way of example. Let it be assumed that the aircraft has strayed off course and is being steered back to the path line 10 with the nose wheel 18 directed at some finite angle to the path line. As the aircraft approaches its prescribed course, this finite angle will diminish because of the damping action before-mentioned. Due to time delay and inertia, however, the nose wheel will still form some small finite angle with the path line even when the forward vertical coil reaches a point directly over the path line. In consequence, a certain amount of hunting or oscillation of the aircraft to either side of the path line will occur.

The rear vertical coil helps greatly to minimize such hunting. When the forward vertical coil is directly over the path line, it will cease to produce an output signal. The rear vertical coil will still be in a signal-producing area, however, because of the finite angle made by the nose wheel relative to the path line. Since the rear vertical coil is polarized in a direction opposite to that of the forward vertical coil, it will produce a signal which commands the direction-control unit to move the aircraft away from the path line back into the area from which it came. Accordingly, a steering influence will be provided which will tend to prevent the aircraft from crossing the path line. Furthermore, if the nose wheel rolls across the path line, the signals produced by the forward and rear vertical coils will add due to their being oppositely polarized and under the influence of fields which are 180° out of phase. This provides greater correction than that which would be provided by the forward coil alone. As a result, the rear vertical coil greatly increases the correction response of the aircraft.

As indicated above, the rear vertical coil is designed to steer the aircraft away from the path line. Accordingly, means must be provided for preventing the signal from the rear vertical coil from predominating over the signal from the forward vertical coil except at the moments of path line approach. To this end, the vertical coils are adapted so that, under the influence of identical magnetic fields, the signal output from the rear vertical coil will be of smaller amplitude than the signal output from the forward vertical coil. This may be accomplished by designing the rear coil to be less sensitive than the forward coil, or by the inclusion of appropriate signal-attenuating resistors (such as the resistor 60 and 61 in FIGS. 6 and 6A respectively) in the coil circuit arrangements. The latter expedient is preferable in that the resistors may be made variable whereby the signal difference between the vertical coils may be varied to suit existing conditions.

It is to be understood that the above-described arrangements are simply illustrative of the application of the principles of the invention. Numerous other arrangements may be devised by those skilled in the art which will embody the principles of the invention and fall within the spirit and scope thereof. For example, while the embodiments have been described with particular reference to aircraft, the present invention is equally applicable to the guidance of other vehicles.

What is claimed is:

1. A vehicle ground guidance system comprising a path-defining unit and a vehicle-directing unit, said path-defining unit including a pair of conductors arranged to define the lateral boundaries of a predetermined ground path, means for electrically interconnecting said conductors to form a closed circuit loop, and generator means for causing alternating electrical current to flow in said loop, said vehicle-directing unit including, an electrical substantially horizontally arranged pick-up coil, an electrical susbtantially vertically arranged pick-up coil, circuit means for comparing the phase of the output signals derived from said pick-up coils, and steering means responsive to the results of said phase comparison for maintaining said vehicle within the path defined by said conductors.

2. A vehicle ground guidance system in accordance with claim 1, which further includes means for stopping said vehicle in response to a reduction of the signal output from said horizontal pick-up coil to below a preselected level.

3. A vehicle ground guidance system according to claim 2, in which said interconnecting means includes at least one transverse link arranged to interconnect said conductors at a preselected stop position along said path.

4. A vehicle ground guidance system according to claim 3, in which said interconnecting means includes a plurality of said transverse links, said links being longitudinally spaced along said path whereby each defines a different preselected stop position, and switching means for interconnecting said conductors through a selected one of said links.

5. A vehicle ground guidance system comprising a path-defining unit and a vehicle-directing unit, said path-defining unit including a pair of conductors arranged to define the lateral boundaries of a predetermined ground path, means for electrically interconnecting said conductors to form a closed circuit loop, generator means for causing alternating electrical current to flow in said loop, said vehicle-directing unit comprising a position-sensing unit and a direction-control unit, the position-sensing unit including an electrical substantially horizontally arranged pickup coil and an electrical substantially vertically arranged pickup coil, the direction-control unit including circuit means for comparing the phase of the output signals derived from said pickup coils, and vehicle steering means responsive to the results of said phase comparison.

6. In a vehicle ground guidance system, a vehicle-directing unit comprising a position-sensing unit and a direction-control unit, the position-sensing unit including an electrical substantially horizontally arranged pick-up coil, and an electrical substantially vertically arranged pick-up coil, said vertical coil being divided into two physical parts, said two parts being arranged so that their longitudinal axes form an angle of approximately 120° therebetween and intersect substantially at the longitudinal axes of said horizontal coil, said two parts being electrically interconnected in parallel, the direction-control unit including circuit means for comparing the phase of the output signals derived from said pick-up coils, and steering means responsive to the results of said phase comparison.

7. In a vehicle ground guidance system, a path-defining unit comprising a pair of conductors arranged to define the lateral boundaries of a predetermined ground path, means including a plurality of transverse links arranged to interconnect said conductors, said links being longitudinally spaced along said path whereby each defines a different pre-selected stop position, switching means for interconnecting said conductors through a selected one of said links and generator means for causing alternating current to flow in said conductors and the selected one of said links.

8. In a vehicle ground guidance system for guiding a vehicle along a predetermined path defined by a pair of spaced conductor portions having current flowing therethrough in opposite directions, a vehicle directing unit comprising a position sensing unit and a direction control unit, the position sensing unit including an electrical substantially horizontally arranged pickup coil and an electrical substantially vertically arranged pickup coil, said vertical coil being arranged in the vehicle directing unit that when said vehicle directing unit is located in said predetermined path the net voltage induced in said vertical coil by the magnetic field about each of said conductor portions is substantially zero and varies in magnitude and phase respectively in accordance with the amount and direction of displacement from said path toward one of said conductor portions, said horizontal coil being arranged in the vehicle directing unit that when said vehicle directing unit is located in said predetermined path the voltage induced in said horizontal coil is at its maximum magnitude and decreases in magnitude with displacement toward either of said conductor portions, said vehicle direction control unit including circuit means for comparing the phase of the induced voltages in said horizontal and vertical coils, and steering means responsive to the results of said phase comparison.

9. A vehicle directing unit according to claim 8, which further includes means for braking said vehicle in response to a reduction of the signal output from said horizontal pickup coil to below a pre-selected level.

10. In a vehicle ground guidance system for guiding a vehicle along a predetermined path defined by a pair of spaced conductor portions having current flowing therethrough in opposite directions, a vehicle having a ground wheel mounted to pivot about a vertical axis, a vehicle directing unit comprising a position sensing unit mounted to pivot horizontally about said vertical axis in unison with said ground wheel, said position sensing unit including an electrical substantially horizontally arranged pickup coil and an electrical substantially vertically arranged pickup coil, said vertical coil being arranged in the vehicle directing unit that when said vehicle directing unit is located in said predetermined path the net voltage induced in said vertical coil by the magnetic field about each of said conductor portions is substantially zero and varies in magnitude and phase respectively in accordance with the amount and direction of displacement from said path toward one of said conductors, said horizontal coil being arranged in the vehicle directing unit that when said vehicle directing unit is located in said predetermined path the voltage induced in said horizontal coil is at its maximum magnitude and decreases in magnitude with displacement toward either of said conductor portions, said vehicle direction control unit including circuit means for comparing the phase of the induced voltages in said horizontal and vertical coils, and steering means responsive to the results of said phase comparison.

11. In a vehicle having a ground wheel mounted to pivot about a vertical axis, a vehicle directing unit comprising a position sensing unit mounted to pivot horizontally about said vertical axis in unison with said ground wheel, said position sensing unit including an electrical substantially horizontally arranged pickup coil and first and second electrical substantially vertically arranged pickup coils, said second vertically arranged coil being mounted to the rear of said first vertically arranged coil along the longitudinal axis of the vehicle to pivot therewith horizontally about said vertical axis in unison with said ground wheel, said first and second vertical coils being interconnected so that their signal outputs subtract and being constructed and arranged such that under the influence of identical magnetic fields the signal output of the latter is of smaller magnitude than the signal output of the former, a direction control unit including circuit means for comparing the phase of the output signals derived from said pickup coils, and steering means for said ground wheel responsive to the results of said phase comparison.

12. In a vehicle having a ground wheel mounted to pivot about a vertical axis, a vehicle directing unit comprising a position sensing unit mounted to pivot horizontally about said vertical axis in unison with said ground wheel, said position sensing unit including an electrical substantially horizontally arranged pickup coil and first and second electrical substantially vertically arranged pickup coils, said second vertically arranged coil being mounted to the rear of said first vertically arranged coil along the longitudinal axis of the vehicle to pivot therewith horizontally about said vertical axis in unison with said ground wheel, said first vertical coil being mounted forwardly of said vertical axis along the longitudinal axis of the vehicle and said second vertical coil being mounted to the rear of said vertical axis along the longitudinal axis of the vehicle, said first and second vertical coils being interconnected so that their signal outputs substract and being constructed and arranged such that under the influence of identical magnetic fields the signal output of the latter is of smaller magnitude than the signal output of the former, a direction control unit including circuit means for comparing the phase of the output signals derived from said pickup coils, and steering means for said ground wheel responsive to the results of said phase comparison.

References Cited in the file of this patent
UNITED STATES PATENTS

| | | |
|---|---|---|
| 2,317,400 | Paulus | Apr. 27, 1943 |
| 2,339,291 | Paulus et al. | Jan. 18, 1944 |
| 2,661,070 | Ferrill | Dec. 1, 1953 |
| 2,859,426 | Davis | Nov. 4, 1958 |
| 3,009,525 | De Liban | Nov. 21, 1961 |
| 3,018,368 | Mountjoy | Jan. 23, 1962 |
| 3,038,970 | Paluka | June 12, 1962 |

OTHER REFERENCES

"Electronic Trail-Finding," by Calvin O. O'Rourke—Control Engineering, vol. 4 (1957), No. 5, pages 117 and 119.